United States Patent [19]

Rizzo

[11] 3,898,763

[45] Aug. 12, 1975

[54] MODEL AIRCRAFT

[75] Inventor: Earl Rizzo, Lakewood, Ohio

[73] Assignee: Cosmo, Inc., Cleveland, Ohio

[22] Filed: July 24, 1974

[21] Appl. No.: 491,316

[52] U.S. Cl. .................................................. 46/79
[51] Int. Cl. .......................................... A63h 27/00
[58] Field of Search ...................... 46/74, 76, 77, 79

[56] References Cited
UNITED STATES PATENTS

| | | | |
|---|---|---|---|
| 3,187,460 | 6/1965 | Robertson | 46/79 |
| 3,590,517 | 7/1971 | Regehr | 46/76 R |
| 3,724,123 | 4/1973 | Lemelson | 46/79 |
| 3,733,737 | 5/1973 | Goodman | 46/79 |

OTHER PUBLICATIONS

Pelaspan Expandable Polystyrene, Catalog 171–190, Dow Chemical Co., Feb. 1958.

*Primary Examiner*—Louis G. Mancene
*Assistant Examiner*—Robert F. Cutting
*Attorney, Agent, or Firm*—Meyer, Tilberry & Body

[57] ABSTRACT

A high performance type model aircraft having exceptional soaring characteristics includes a delta wing with shallow reflex at its trailing edge, a nose pod and a vertical stabilizer secured to the rear center portion of the underside of the wing. A wooden dowell is embedded in the nose pod and extended into the wing to protect the nose pod against impact and to establish the center of gravity of the aircraft. The aircraft is one piece blow molded styrofoam construction with all leading edges reinforced with vinyl tape.

11 Claims, 9 Drawing Figures

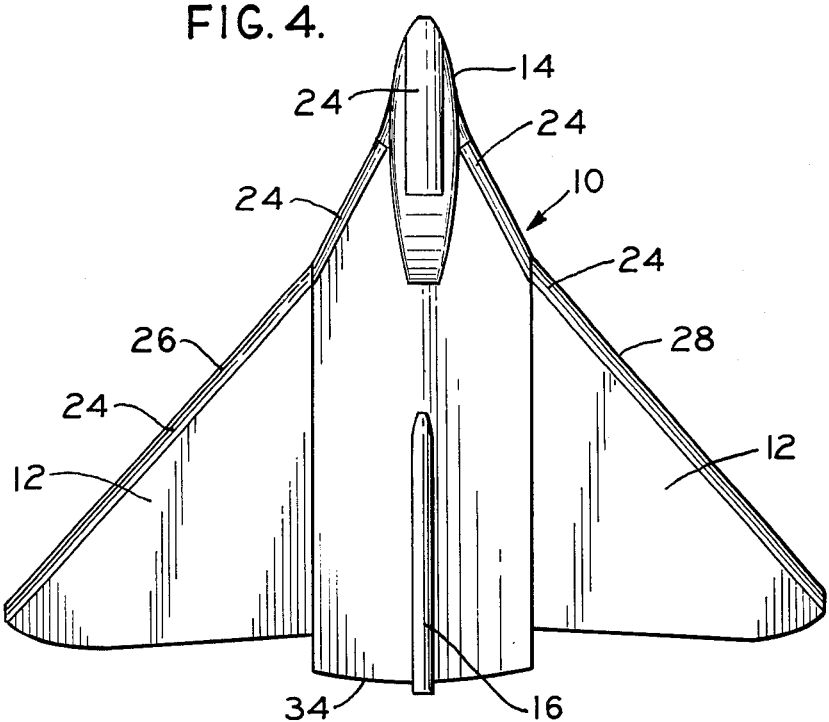
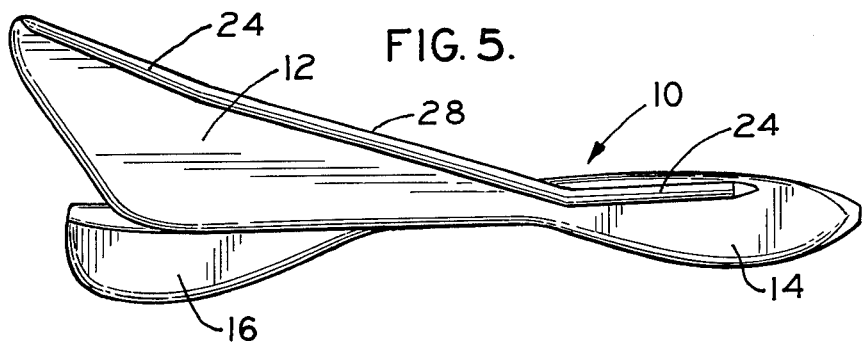
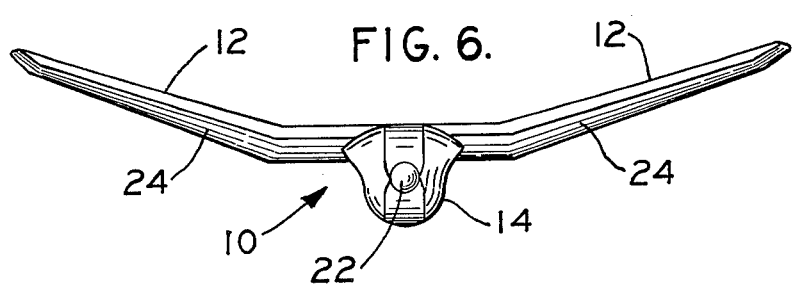

MODEL AIRCRAFT

BACKGROUND

This invention relates to an improvement in an aerodynamically designed and balanced model aircraft as distinguished from the innumerable plastic toys which may be found in the marketplace designed to resemble aircraft but not having any true aerodynamic flying capability. The invention may also be characterized as a high performance type model aircraft which will soar as well as glide, thereby further distinguishing it from other types of model aircraft which are incapable of soaring, or can only soar under the most optimum of circumstances.

Most, if not all, model aricraft known to the inventor claiming to having gliding or soaring capabilities, upon his information and belief, must be assembled from model aircraft kits wherein the wings, fuselage and tail assembly all must be joined together and then delicately aerodynamically balanced. It has been the experience of the inventor that purchasers of these kits are usually incapable of properly aerodynamically balancing the assembled aircraft, resulting in a consequent predictable failure of performance. Furthermore, when model aircraft are assembled from kits there is an inherent weakness between the junction of the wings and the body, and between the body and the tail assembly. Thus, when the aircraft comes in for a landing, or strikes an object in mid-air, the wings are many times forced out of alignment, causing aerodynamic imbalance. More often, when coming in for a landing, the assembled aircraft will catch a wing tip on the ground which will cause the aircraft to cartwheel and also cause misalignment of the wings and tail assembly, thereby destroying the aerodynamic balance of the aircraft.

THE INVENTION

In view of these inherent defects in model aircraft kits, the present invention preferably comprises an aircraft made of a single piece of blow molded styrofoam, or other light weight plastic material. By so fabricating the present invention, aerodynamic balance is engineered into the aircraft and it is ready to fly and soar without the requirement of any additional input of skill or expertise of the amateur model aircraft enthusiast. Most remarkable about this one piece styrofoam model aircraft is the fact that it is virtually indestructable once it has become airborne. This fact seems contrary to the first impression one receives from observing this invention, based on common experience with other light plastic products and their known frangibility. However, during an eight month period twenty-one models of the subject invention have been flight tested, each model having been flown a minimum of 600 times. All 21 models, as of the preparation of this application, are still in perfect flying condition. Obviously, a light plastic model aircraft can be crushed if it is stepped upon or otherwise abused, but once the aircraft is airborne it can collide with an object in mid-air, it can collide with the ground, trees, buildings, or other obstacles, which normally would be expected to be encountered in flying model aircraft, without perceptible damage. At no time has any collision of any of the models tested been damaged by collision with an object once it has become airborne. The reason for this remarkable durability of this aircraft is to be found in at least two features of the invention. The first is a dowell, preferably of wood, which is embedded in the body of the aircraft, one end being in the same plane as the nose of the aircraft body, the dowell extending rearwardly along the longitudinal axis of the body into the wing. It has been found that with this wooden dowell, so embedded in the aircraft body, any impact of the nose against an immovable object will result in the shock being taken up by the dowell and with no resultant damage to the aircraft.

Inasmuch as the nose of the body of the aircraft is the leading portion of the aircraft in flight, most collisions are by nose impact, and the aircraft is thus protected from damage. Additionally, the leading edges of the wing are reinforced with vinyl tape which improves the efficiency of the airfoil and protects the edges from tearing or damage, when, for instance, the aircraft is falling down through the branches of a tree or shrubbery. The vinyl tape also protects the leading edges in the event of the collision of the wing in flight against any object whatsoever. Because the aircraft is unitary, such collisions as do occur between the aircraft and a foreign object do not result in any misalignment of the critical relationship between the wing, or the body and the tail assembly. Thus, the aircraft always maintains its aerodynamic alignment, balance and flight-worthiness.

Perhaps the most unusual characteristic of this model aircraft is that it has excellent soaring ability, notwithstanding the fact that it is basically a delta wing, which according to all published literature studied by the inventor teaches that soaring abilities of delta wings are poor. Although the inventor does not fully understand why his delta wing type model aircraft has been so successful in soaring, it is a fact that this aircraft has been timed in free-flights lasting over 4 minutes and obtaining altitudes of over 200 feet. The longest time flight of this aircraft was approximately 8 minutes, wherein it disappeared straight up circling in a cloudless sky. This model was never recovered. Three models have been lost in flight in this manner. One minute soaring flights are not uncommon for this model aircraft. The model flys best in winds of 5 to 15 miles per hour.

Launching consists of gripping the vertical stabilizer assembly, referred to hereinafter as the "rudder", between the thumb and second finger, placing the index finger on the rear end of the rudder and manually thrusting the aircraft gently into the wind. If the aircraft is thrown too hard into the wind the model will loop and land after a short flight. When the aircraft is launched to an altitude of about twenty feet, the model will roll out at the top of the loop and immediately start soaring and circling. Launching the aircraft into the wind causes the model to make a fast climb to twenty feet, and, as it loses momentum, the model will half roll into a flat glide and immediately react to any up-drafts or thermals by climbing and circling in a manner much similar to soaring type birds, such as hawks. The invention will usually fly up-wind in spite of its low wing loading and, as a result, it has much less drifting tendency then any other free-flight model airplane of any design known to the inventor. The invention also has excellent landing characteristics, coming in tail down and flairing out into a smooth, gentle landing, thereby avoiding excessive wear on the nose and wing portions, such as is so commonplace with kit assembled type model aircraft. It has been test crashed into a stone wall in a 20-mile per hour gust of wind with no perceptible damage of any kind whatsoever. The invention also resists stalls and, if forced by a sudden gust of wind in excess of fifteen miles per hour to stall, will recover by simply flipping completely over until it is in a stable flight condition, again, usually without losing any altitude. Furthermore, this model aircraft has been tested in flights in excess of two minutes in temperatures as low as twenty-seven degrees farenheit.

It is, therefore, an object of this invention to provide a high performance type model aircraft which will soar as well as glide;

It is an object of this invention to provide a high performance type model aircraft having exceptional soaring ability;

It is an object of this invention to provide a soaring and gliding model aircraft which is highly resistant to damage once airborne;

It is an object of this invention to provide a high performance type model aircraft fabricated in a one piece mold using expandable plastic pellets such as styrofoam;

It is an object of this invention to provide a high performance type model aircraft which is designed to safely absorb shock, once airborne, upon nose impact with another object;

It is an object of this invention to provide a high performance type model aircraft which is designed to resist damage, once airborne, upon impact of the leading edges of the wing with another object and, It is an object of this invention to provide a high performance type model aircraft with a delta wing which has exceptional soaring capability.

Other objects and advantages of this invention will become apparent from a study of the following description of the invention taken in conjunction with the figures and the appended claims.

Reference is now made to the drawings wherein:

FIG. 4 is a bottom plan view of the preferred embodiment of the invention shown in FIG. 1;

FIG. 5 is a side view of the preferred embodiment of the invention shown in FIG. 1;

FIG. 6 is a front view of the preferred embodiment of the invention shown in FIG. 1;

Figure 1:
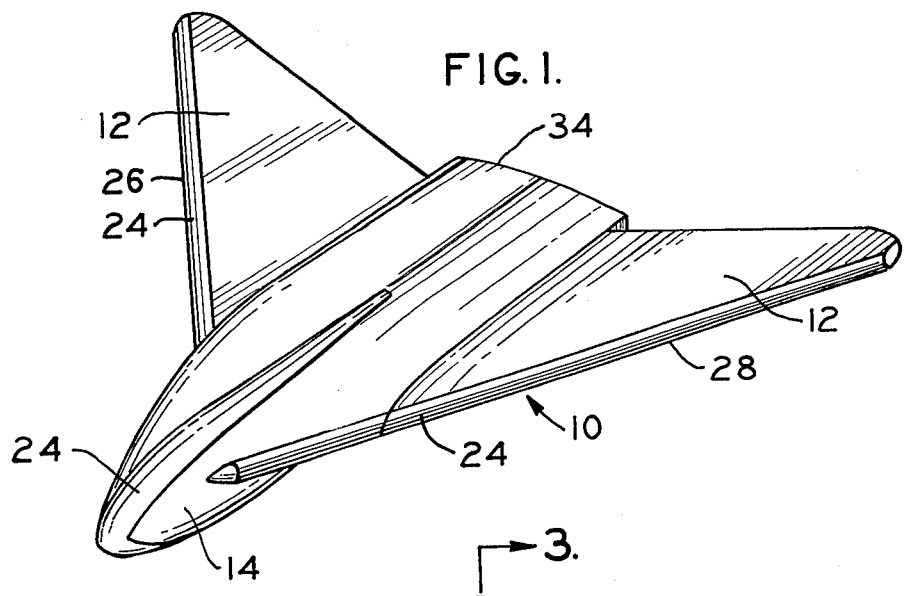
FIG. 1 is a perspective view of a preferred embodiment of the invention.
Figure 2:
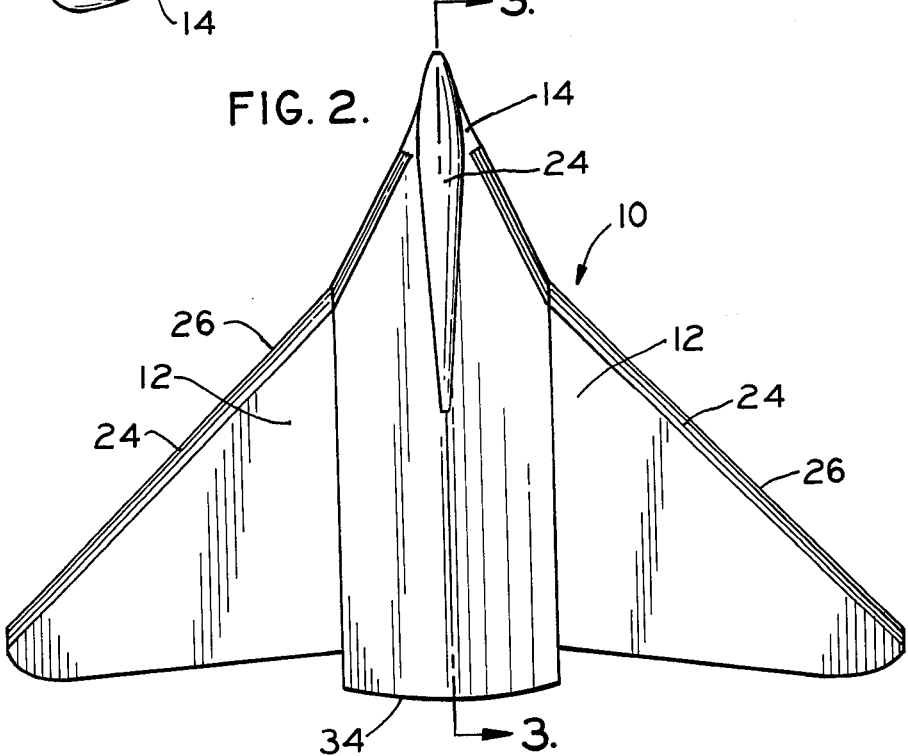
FIG. 2 is a top plan view of a preferred embodiment of the invention.

Referring now to the drawings in greater detail, and in particular to FIG. 1, it will be observed that the invention comprises a delta wing model aircraft 10, preferably of one piece blow molded styrofoam composition, having a delta wing 12, a nose pod type body 14, and rudder 16 (see FIG. 4). Rudder 16 is secured to the center portion of the underside of the delta wing, having its end portion 18 (see FIG. 3), in the same plane as the trailing edge of the wing, and the body of the rudder 16 being aligned along the longitudinal axis of the plane. A dowell 20 is embedded in the nose pod 14 with one end 22 in the same plane as the leading edge of the nose. Dowell 22 extends rearwardly along the longitudinal axis of the plane, and is selected by length, diameter and weight so as to establish the center of gravity of the aircraft. The nose pod 14 is also reinforced with vinyl tape 24 to protect it against abrasion, as are the leading edges 26 and 28 of the delta wing 12. Although it is contemplated that the lower edge of the rudder member 16 can also, in like manner, be reinforced with vinyl tape, as a matter of experience it has been found that this has not been necessary. However, it is recognized that on certain types of landing surfaces abrasion may be greater than on others and such reinforcement may be advantageous.

Figure 3:
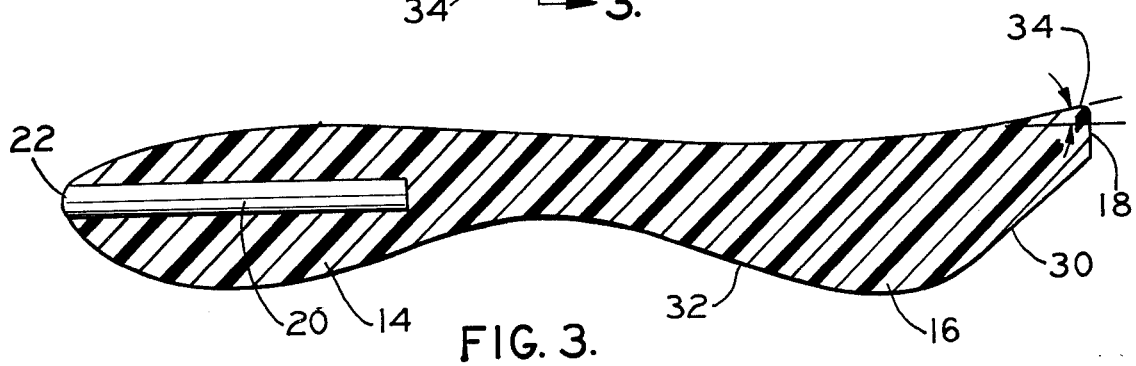
FIG. 3 is a full sectional view taken along the line 3—3 of FIG. 2.
Figure 7:
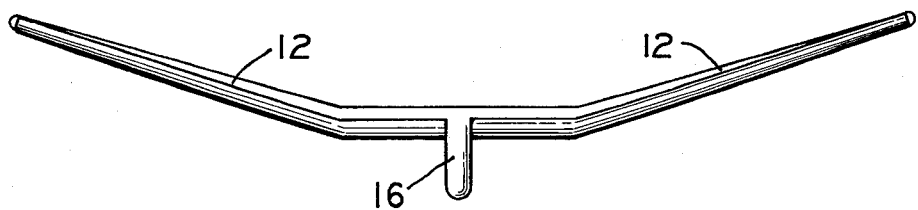
FIG. 7 is a rear view of the preferred embodiment of the invention shown in FIG. 1.

It is important to note that the rudder in the preferred embodiment of the invention (see FIG. 3) is tapered both rearwardly and forwardly at 30 and 32 respectively, although a rudder tapered only rearwardly is also satisfactory. If the rudder 16 were generally rectangular, the aircraft would tend to fly in a straight path, making recovery difficult if not impossible. Accordingly, the center of effort of the rudder is in effect shifted forwardly by tapering the rear portion of the rudder which enables the aircraft to turn more easily about its vertical turning axis. In other words, by tapering both the rear and forward portions of the rudder the exact moment of turning is predetermined for maximum performance. At the same time the advantage is retained of having the end portion 18 of the rudder 16 in the same vertical plane as the trailing edge 34 of the wing. Thus, referring to FIGS. 3 and 7, showing the rear portion of the aircraft, it will be seen that the trailing edge 34 of the wing is protected against damage by providing a place for the index finger to rest in order to launch the aircraft. By placing the index finger on the back edge 18 of the rudder, the thumb and second finger of the hand come to rest naturally on opposite sides of the rudder 16 to provide a secure grip of the aircraft during launching.

It will also be noted from observing FIG. 3, that the trailing edge 34 of the wing 12 is formed with a shallow reflex shown at A in the order of from 3° to 5°. This amount of reflex has been found to provide optimum soaring enhancement.

Figure 8:
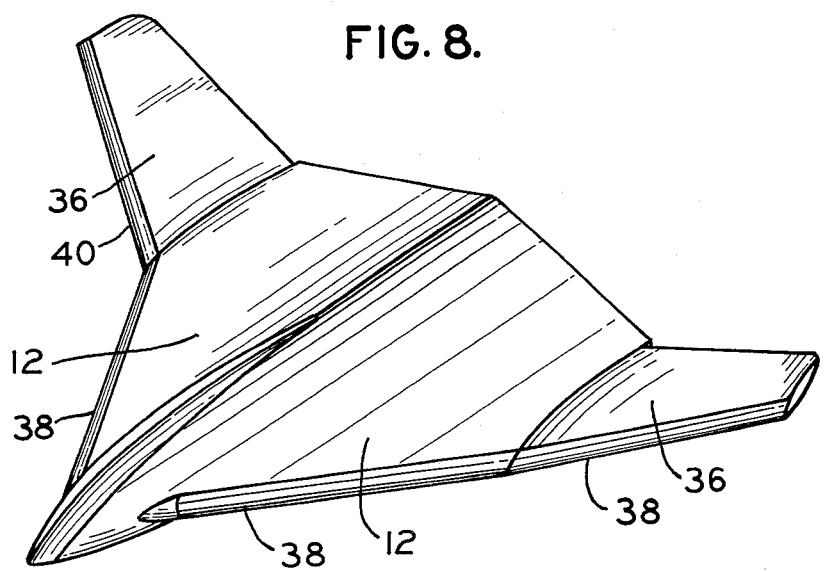
FIG. 8 is a perspective view of another preferred embodiment of the invention with a modified delta dihedral wing.
Figure 9:
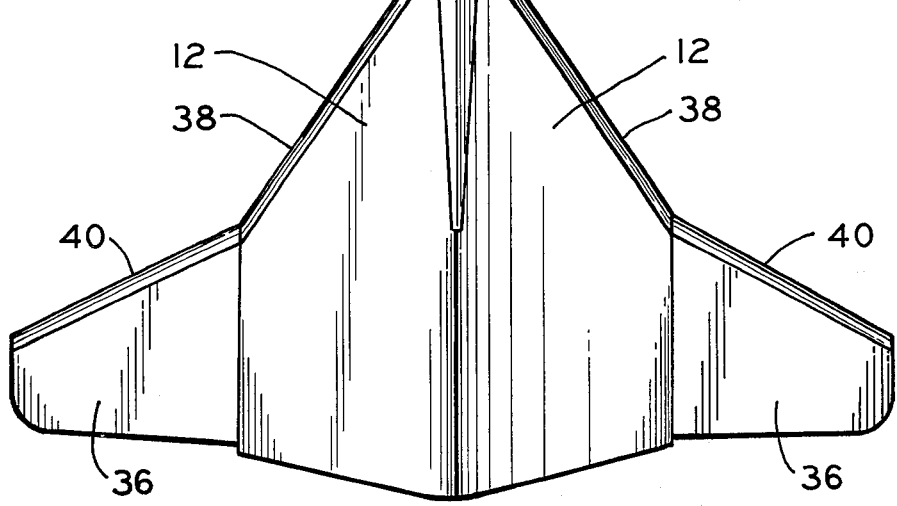
FIG. 9 is a top plan view of another preferred embodiment of the invention with a modified swept back delta wing.

It will be understood by those learned in aerodynamic theory that various modifications may be made to the wing 12 in order to achieve certain pre-selected flight characteristics. Thus for instance, the dihedrals 36 of the wing 12 may be accentuated, as shown in FIG. 8, to provide stability during steep banks. In like manner, the wing 12 may be swept back in stages 38 and 40, as shown in FIG. 9, to obtain yet other flight characteristics.

Although only three modifications of the delta wing have been shown in the figures, many other configurations of delta wings have been successfully tested comprising other embodiments of the invention, each modification providing a slightly different characteristic of flight.

However, each embodiment has demonstrated the same essential advantageous features common to all modifications of the invention. Thus, the invention has been shown and described with particular reference to preferred embodiments, but it is obvious that equivalent alterations and modifications as touched upon in this specification will occur to others skilled in the art upon the reading and understanding of this invention. The invention includes all such equivalent alterations and modifications, and is intended to be limited only by the scope of the claims.

Having thus described my invention, I claim:

1. A one piece high performance type soaring model aircraft comprising a delta wing air foil, a nose pod, and a rudder secured to the rear center portion of the underside of the wing; said wing, nose pod and rudder being formed from a unitary piece of light weight plastic material, and a dowel embedded in the nose pod extending from the front surface of the nose pod rearwardly along the longitudinal axis of the aircraft, wherein impact between the nose and a foreign object is absorbed by said dowell.

2. The model aircraft of claim 1, said delta wing having leading edges and a trailing edge, and said leading edges of the delta wing being reinforced with tape to aid the flow of air over the top of said delta wing.

3. The model aircraft of claim 1, wherein the trailing edge of said wing is formed with a shallow reflex.

4. The model aircraft of claim 1, wherein the trailing edge of said wing is formed with a reflex in the range of 3° to 5°.

5. The model aircraft of claim 1, wherein said dowell is positioned in said pod to pre-determine the center of gravity of the aircraft.

6. The model aircraft of claim 1, wherein the rear end of said rudder is positioned adjacent the trailing edge of of said wing to provide a thrust pad for launching.

7. The model aircraft of claim 1, wherein the rear portion of said rudder is tapered back toward the trailing edge of said wing to pre-determine the moment of turning for the aircraft.

8. The model aircraft of claim 1, wherein both the forward and rearward portions of said rudder are tapered toward the underside of said wing to pre-determine the moment of turning for the aircraft.

9. The model aircraft of claim 1, wherein said aircraft is formed of one piece blow molded styrofoam construction.

10. The model aircraft of claim 1, wherein the wing, pod, and rudder are pre-balanced and permanently secured one part to another to establish and to maintain aerodynamic stability.

11. A one piece high performance type soaring model aircraft comprising a delta wing airfoil, a nose pod, and a rudder formed in the rear center portion of the underside of the wing, said wing, nose pod and rudder being formed from a unitary piece of light plastic material; a dowel embedded in the nose pod extending from the front surface of the nose pod rearwardly along the longitudinal axis of the aircraft, wherein an impact between the nose and a foreign object is absorbed by said dowel; said delta wing having leading edges and a trailing edge, said leading edges being reinforced with tape to protect these leading edges and to aid the flow of air over the top of said delta wing; said trailing edge of said wing being formed with a shallow reflex; said dowel being positioned in said pod to pre-determine the center of gravity of the aircraft; the rear end of said rudder being positioned adjacent the trailing edge of said wing to provide a thrust pad for launching; said rudder being tapered to pre-determine the moment of turning for the aircraft; said aircraft being formed from one piece blow molded styrofoam; and said wing, pod, and rudder being pre-balanced and permanently molded one part to the other wherein to pre-establish and to maintain aerodynamic stability.

* * * * *